March 11, 1924. 1,486,771
F. LJUNGSTRÖM
METHOD OF PRODUCING DEEPER TOOTH SPACES IN TOOTHED WHEELS AND MEANS THEREFOR
Filed Sept. 19, 1922
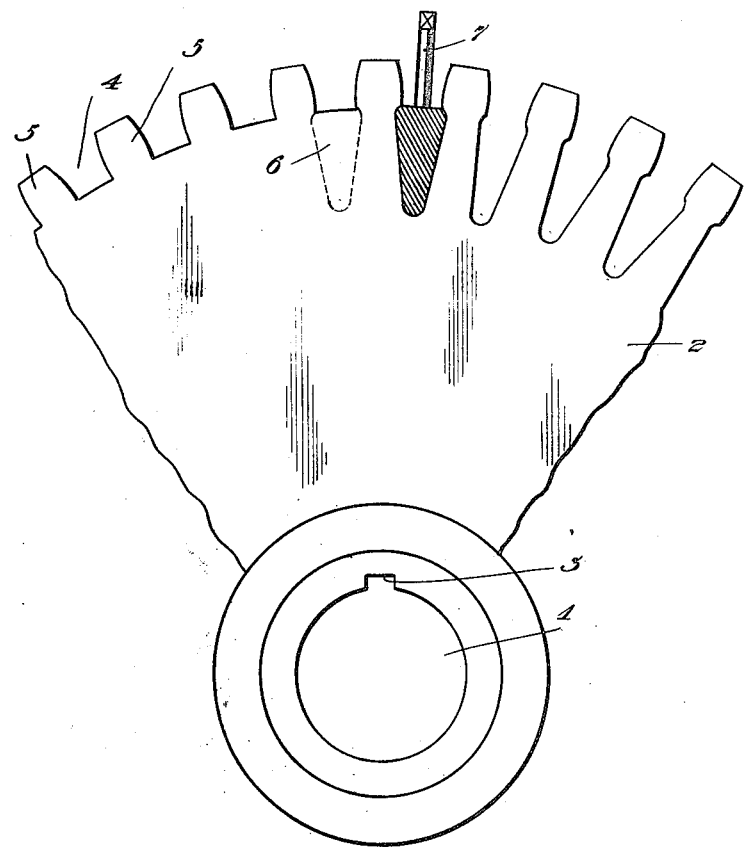
Inventor
F. Ljungström
By Marker Clerk
Attys Patented Mar. 11, 1924.

1,486,771

UNITED STATES PATENT OFFICE.

FREDRIK LJUNGSTROM, OF LIDINGO-BREVIK, SWEDEN, ASSIGNOR TO AKTIEBOLAGET LJUNGSTRÖMS ÅNGTURBIN, OF STOCKHOLM, SWEDEN, A CORPORATION.

METHOD OF PRODUCING DEEPER TOOTH SPACES IN TOOTHED WHEELS AND MEANS THEREFOR.

Application filed September 19, 1922. Serial No. 589,245.

*To all whom it may concern:*

Be it known that I, FREDRIK LJUNGSTRÖM, chief engineer, a subject of the King of Sweden, residing at Lidingo-Brevik, Sweden, have invented certain new and useful Improvements in Methods of Producing Deeper Tooth Spaces in Toothed Wheels and Means Therefor, of which the following is a specification.

The present invention refers to a method of producing deeper tooth spaces in toothed wheels, which spaces, as is well known, facilitate a considerably increased resiliency of the teeth and thus an increased possibility for the latter to adapt themselves for engagement with other teeth. In toothed wheels with deepened tooth spaces, the teeth are preferably shaped so that stems thereof are somewhat undercut so as to be peripherally somewhat narrower than the heads of the teeth adjacent thereto.

The invention relates particularly to a method of producing tooth spaces arranged in the manner set forth above, and the invention is illustrated in the accompanying drawing which by way of example, shows a portion of a cylindrical toothed wheel viewed in the axial direction, said wheel being partly provided with tooth spaces of the said description, and means for carrying the method into effect.

The production of the tooth spaces takes place in the following manner:

In the drawing, 1 designates the shaft hole provided in the nave of the wheel, and 3 is the key slot in the same nave. 2 represents the body of the wheel. The latter is first provided with teeth 5 and tooth spaces 4 of, for instance, normal shape, said spaces being produced in any suitable manner, for example by means of a worm hob or by planing. In order to produce the deepened tooth spaces, material is removed at the bottom of the tooth spaces 4, the cross section of which material corresponds to the surface denoted by 6. The said quantity of material is removed by means of an end mill or coned milling cutter 7, the edges of which correspond to the shape of the desired deepened tooth space in a section at right angles to the longitudinal direction of the teeth. As will be seen from the drawing, the remotest working surface of the milling cutter, counted from the axis of the wheel, has a diameter greater than the smallest distance between the working surfaces of two adjacent teeth 5 as originally produced, whereby the undercut portions are brought about in the deepened tooth spaces adjacent to the heads of the teeth, so that the upper portion of the stem of the tooth will be narrower than the head of the tooth. The milling is of course effected by the cutter being moved axially through the toothed wheel, while the longitudinal axis thereof is at the same time maintained in a radial position.

As mentioned above, the drawing shows for instance a toothed wheel which is provided with straight teeth, but it is obvious that the same method is also applicable for producing spiral cut teeth.

What I claim as new and desire to secure by Letters Patent of the United States of America is:—

1. A method of producing deepened tooth spaces in toothed wheels, comprising producing first teeth and tooth spaces of substantially normal shape according to any suitable method and then deepening the tooth spaces by means of an end mill.

2. A method of producing deepened tooth spaces in toothed wheels, comprising producing first teeth and tooth spaces of substantially normal shape according to any suitable method and then deepening the tooth spaces by means of an end mill, the longitudinal axis of the end mill being maintained in a radial position during the milling operation and the outline of the end mill corresponding to the shape of the deepened space in a section at right angles to the longitudinal direction of the teeth.

3. A method of producing toothed wheels consisting in first forming teeth and tooth spaces in the wheel of substantially normal shape, and then operating upon the wheel radially inward to deepen the tooth spaces.

In testimony whereof I affix my signature in presence of two witnesses.

FREDRIK LJUNGSTRÖM.

Witnesses:
L. BERG VON LEIDE,
ERIC HATGER.